US007824170B2

(12) United States Patent
Meissner et al.

(10) Patent No.: US 7,824,170 B2
(45) **Date of Patent: *Nov. 2, 2010**

(54) ROTOR FOR A ROTARY TABLET PRESS

(75) Inventors: Friedrich Meissner, Hamburg (DE); Wolfgang Soltau, Neu Darchau/Katemin (DE)

(73) Assignee: Fette GmbH, Schwarzenbek (DE)

( * ) Notice: Subject to any disclaimer, the term of this patent is extended or adjusted under 35 U.S.C. 154(b) by 110 days.

This patent is subject to a terminal disclaimer.

(21) Appl. No.: 12/208,909

(22) Filed: Sep. 11, 2008

(65) Prior Publication Data

US 2009/0252823 A1 Oct. 8, 2009

(30) Foreign Application Priority Data

Sep. 13, 2007 (DE) ....................... 10 2007 043 582

(51) Int. Cl.
*B29C 43/08* (2006.01)

(52) U.S. Cl. ....................................... 425/345; 425/352

(58) Field of Classification Search ......... 425/344-345, 425/78, 352-355
See application file for complete search history.

(56) References Cited

U.S. PATENT DOCUMENTS

| | | | | | |
|---|---|---|---|---|---|
| 2,068,619 | A * | 1/1937 | Balley | ........................ | 425/345 |
| 4,298,563 | A * | 11/1981 | DeSantis et al. | ............ | 425/352 |
| 5,004,413 | A | 4/1991 | Stopforth | | |

FOREIGN PATENT DOCUMENTS

| | | |
|---|---|---|
| DE | 101 59 114 A1 | 6/2003 |
| DE | 10 2004 040 163 B3 | 5/2006 |

* cited by examiner

*Primary Examiner*—Richard Crispino
*Assistant Examiner*—Thu Khanh T Nguyen
(74) *Attorney, Agent, or Firm*—Vidas, Arrett & Steinkraus, P.A.

(57) ABSTRACT

A rotor for a rotary tablet press, which has an upper and a lower punch guide for upper and lower punches that interact with holes in a die plate that is arranged between the upper and lower punch guide, where the punches are axially movable in guide holes of the punch guides and have heads that interact with compression rollers of the tablet press, wherein the press punches are guided axially in the guide holes secure against rotation, and the punch heads have on opposite sides flat areas that are facing the adjacent punch heads.

3 Claims, 3 Drawing Sheets

ROTOR FOR A ROTARY TABLET PRESS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The typical rotor for a rotary press has a die plate as well as a lower and upper punch guide for the lower and upper punches which interact with holes in the die plate. The rotor is driven by a suitable drive motor around a vertical axis, and the powdered material that is being filled by a filling device into the die holes, is compressed by the press punches. The compression occurs in at least one compression station which has an upper and lower compression roller that interact with the heads of the press punches. In the remaining rotary phases, the press punches are guided by suitable punch curves, among others for ejecting the pellets by the lower punches using appropriate control curves. Such rotors are known from U.S. Pat. No. 5,004,413, DE 101 59 114 A1, or DE 10 2004 040 163 B3, the entire contents of each of these references are incorporated herein by reference.

The distance between press punches, which are arranged in pairs on a partial circle on the rotor, is essentially determined by the diameter of the punch heads. The top side of the press punch heads with which the compression rollers interact is essentially standardized. Between the engagement lines on the punch heads there exists a not inconsiderable distance, which results in the fact that that an uneven transition of the compression roller occurs from one to the following punch. This causes a considerable noise emission to develop. In addition, this causes wear on the punch and the compression roller.

The objective of the invention is to reduce the unfavorable interaction between the compression roller and the punch head, and, with equal pressure holding time, to increase the space for the number of pressing stations on the partial circle, without increasing the expenditure for the apparatus for a press rotor.

BRIEF SUMMARY OF THE INVENTION

With the rotor according to the invention, the punches are secured against rotation, that is, they are guided exclusively axially in the guide holes. All axial guidance as such is known. However, it is essential for the invention that the punch heads have flat areas on opposite sides that are facing the adjacent punch heads. The rotary position of the punches which is determined by the exclusively axial guidance, enables therefore the orientation of the flat areas on the punch heads towards the adjacent punch heads.

The invention yields the advantage that the punches can be located closer to each other on the partial circle, and therefore have a smaller distance from each other. Therefore it is possible to arrange more punch pairs on a partial circle diameter. This is advantageous with respect to the production volume, because with the same rotor at equal rotational speed a greater number of pellets can be created than with conventional rotors.

The more favorable interaction between the compression roller and the punch head through the homogenized transition of the compression roller from one punch head to the following one is particularly advantageous. In this way, the noise emission is reduced due to the lower force variations of the compression roller. Furthermore, this reduces the oscillations of the rotary press. Finally, the wear on the punches and the compression rollers is reduced as well.

Different possibilities are conceivable to guide a punch axially in the guide holes of the rotor and to secure it against rotation. This can occur, for instance, in that the punch shafts have a feather key groove, and the guide holes contain a feather key, or vice versa. It is particularly advantageous if according to one embodiment of the invention the shafts of the press punches in their cross section have a non-round profile, and the cross section of the guide holes is complementary. This results not only in an orientation in circumferential direction with the desired position of the flat areas, but such punch shafts can be sealed better, using suitable sealing rings.

BRIEF DESCRIPTION OF EACH OF THE DRAWINGS

In the following, the invention is explained in more detail using drawings.

DETAILED DESCRIPTION OF THE INVENTION

Figure 1:
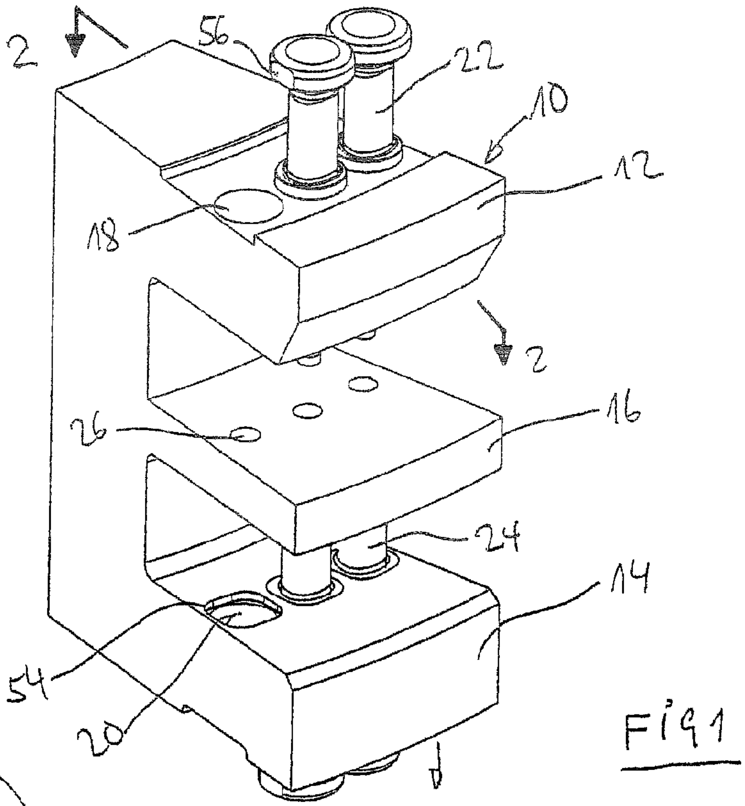
FIG. 1 shows in perspective a section of a rotor according to the invention.

While this invention may be embodied in many different forms, there are described in detail herein a specific preferred embodiment of the invention. This description is an exemplification of the principles of the invention and is not intended to limit the invention to the particular embodiment illustrated A rotor 10, of which only a section is shown in FIG. 1, has an upper punch guide 12 and a lower punch guide 14, as well as a die plate 16 between the upper and the lower punch guide 12, 14. In the case shown, all parts are a unitary unit. It is understood that it can also consist of a plurality of parts. In particular, the die plate can consist of individual segments.

The upper punch guide 12 has receiving holes 18, and the lower punch guide 14 has receiving holes 20. The punch guides 12, 14 guide pairwise the upper punches 22 and the lower punches 24 which interact with the die holes 26 in the die plate 16, in order to compress powdered material in the die holes 26.

Figure 2:
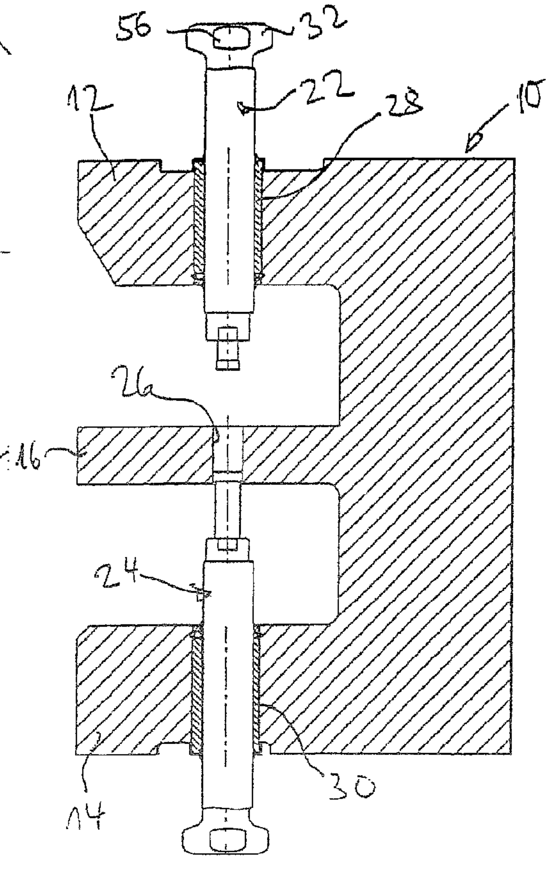
FIG. 2 shows a section through the representation according to FIG. 1 along the line 2-2.
Figure 3:
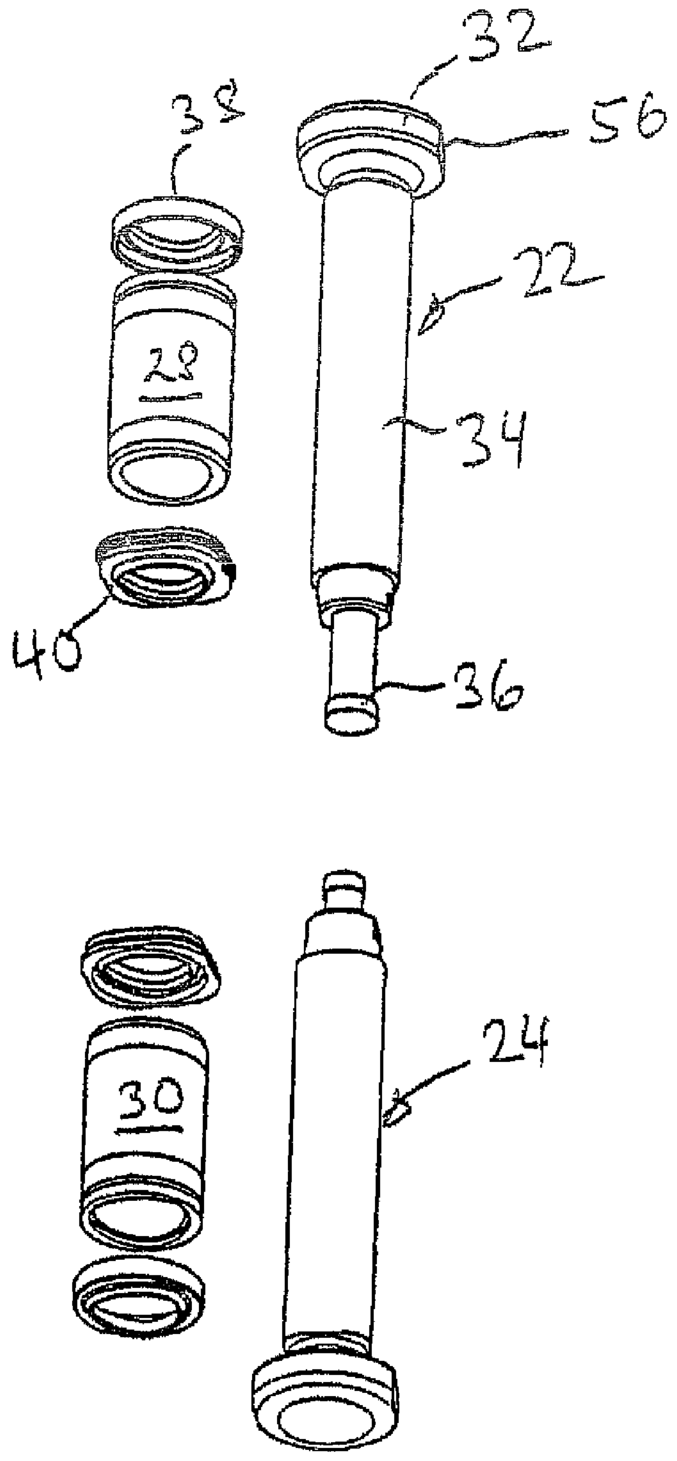
FIG. 3 shows an exploded representation of a punch pair with slide bushings and seals.

As can be recognized in particular in FIG. 2, the receiving holes 18, 20 accept guide bushings 28, 30. FIG. 3 shows upper and lower punches 22, 24, and guide bushings 28, 30. The press punches 22, 24 have a head 32, a shaft 34, and a tool section 36. Only the tool section 36 interacts with the die hole 26 (in the following, only the upper punch 22 is explained, while the lower punch 24 is to be viewed the same way). The head 32 is at its top side essentially standardized. It interacts with the compression rollers, not shown in FIGS. 1 and 2, which press the upper punch 22 into the die hole 26 against the press material. The shaft 34 has a non-round cross section.

Figure 4:
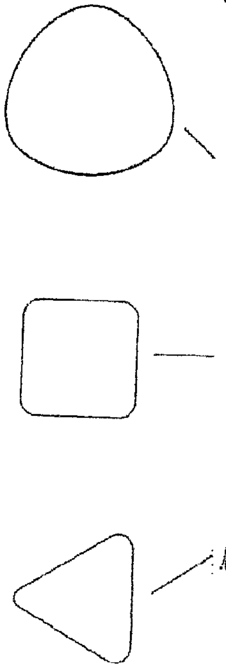
FIG. 4 shows three different cross section profiles for the press punch in the FIGS. 1 and 2.

FIG. 4 shows the cross section shapes in an exemplary manner. They show a triangular cross section, a square cross section, and a cross section composed of three segments of a circle, where the transitions are rounded. The guide bushings 28, 30 which can consist of ceramic material and which are glued into the receiving holes 18 and 20, respectively, have a cross section that is complementary to the cross section of the shafts. Therefore, the described cross sections determine the rotary position of the punches 22, 24 in the punch guides 12 and 14, respectively an upper sealing ring 38 and a lower sealing ring 40 is assigned to each punch 22, 24 or to each guide bushing 28 or 30, respectively.

Figure 5:
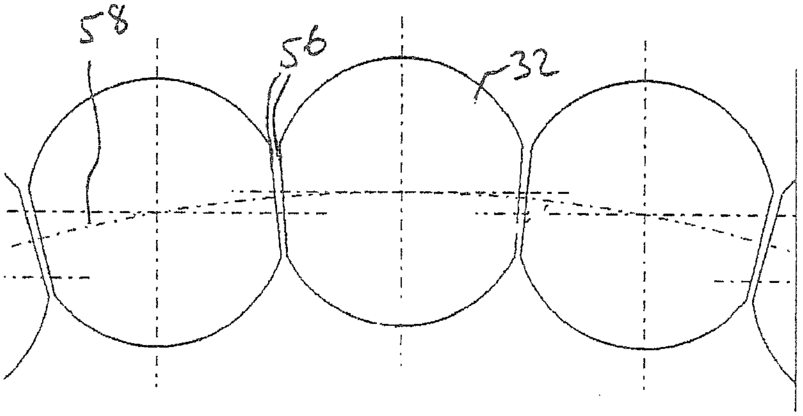
FIG. 5 shows a top view of several press punches of a rotary press that is not otherwise shown.

It is also apparent from FIGS. 1 and 2 that the punch heads 32 have at their sides flat areas 56 that in each case face adjacent punch heads. In the FIGS. 5 to 7, the flat areas are described in somewhat more detail. It can be recognized that the flat areas are not located diametrically opposite each other, or run in parallel, but rather extend approximately perpendicularly to the tangent at the partial circle 58 on which the punches 22 and 24 are arranged in the rotor 10. Thus, according to FIG. 7, the flat areas 56 converge towards the center of the partial circle, as represented particularly clearly in FIG. 7.

Figure 6:
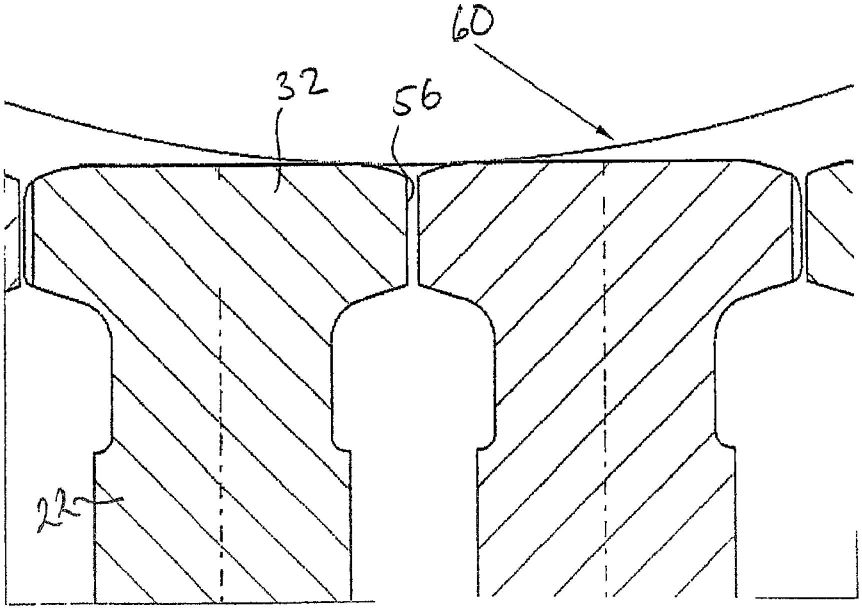
FIG. 6 shows two adjacent press punches in a section below a compression roller.
Figure 7:
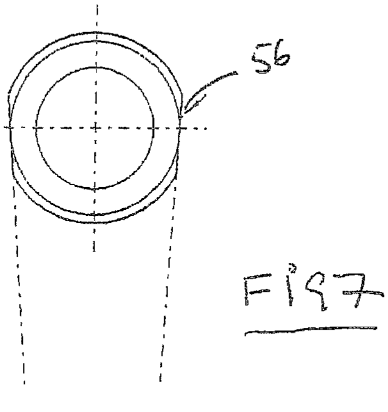
FIG. 7 shows also a top view of a punch press head.

In FIG. 6, the circumference of a compression roller is indicated with 60, below which the punch heads 32 are moved along, so that the punches 22 are pressed downward into the die holes 26. As is particularly apparent here, the transition of the circumference of the compression roller from one punch top side to the following one is almost even, so that only slight impacts are created that lead to oscillations of the rotor.

The above disclosure is intended to be illustrative and not exhaustive. This description will suggest many variations and alternatives to one of ordinary skill in this art. All these alternatives and variations are intended to be included within the scope of the claims where the term “comprising” means “including, but not limited to”. Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A rotor for a rotary tablet press, which has an upper and a lower punch guide for upper and lower punches that interact with holes in a die plate that is arranged between the upper and lower punch guide, where the punches are axially movable in guide holes of the punch guides and have heads that interact with compression rollers of the tablet press, characterized in that the press punches (22, 24) are guided axially in the guide holes secure against rotation, and the punch heads (32) have on opposite sides flat areas (56) that are facing the adjacent punch heads (32).

2. The rotor according to claim 1, characterized in that the shafts of the press punches in their cross section have a non-round profile, and the cross section of the guide holes is complementary.

3. The rotor according to claim 1, characterized in that the press punches (22, 24) are arranged on a partial circle (58), and the flat areas (56) extend approximately perpendicular to the partial circle (58).

* * * * *